Feb. 3, 1925. 1,524,682
C. B. BAILEY
GASKET
Filed Sept. 1, 1921
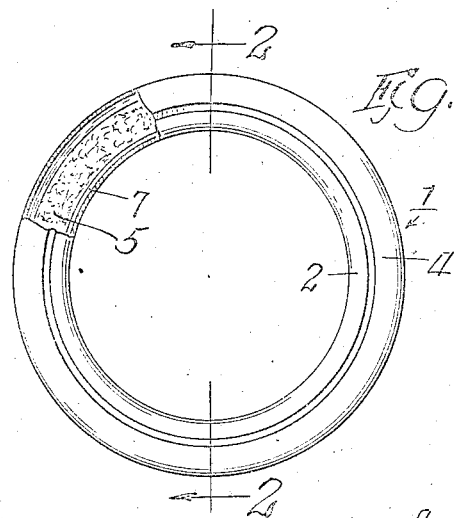
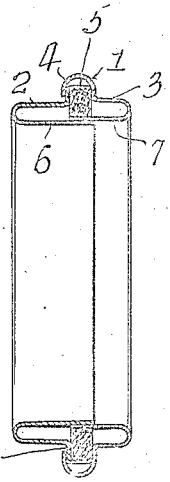
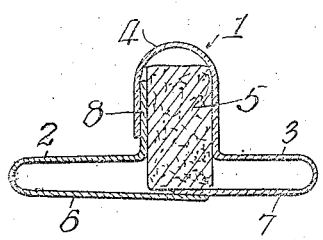
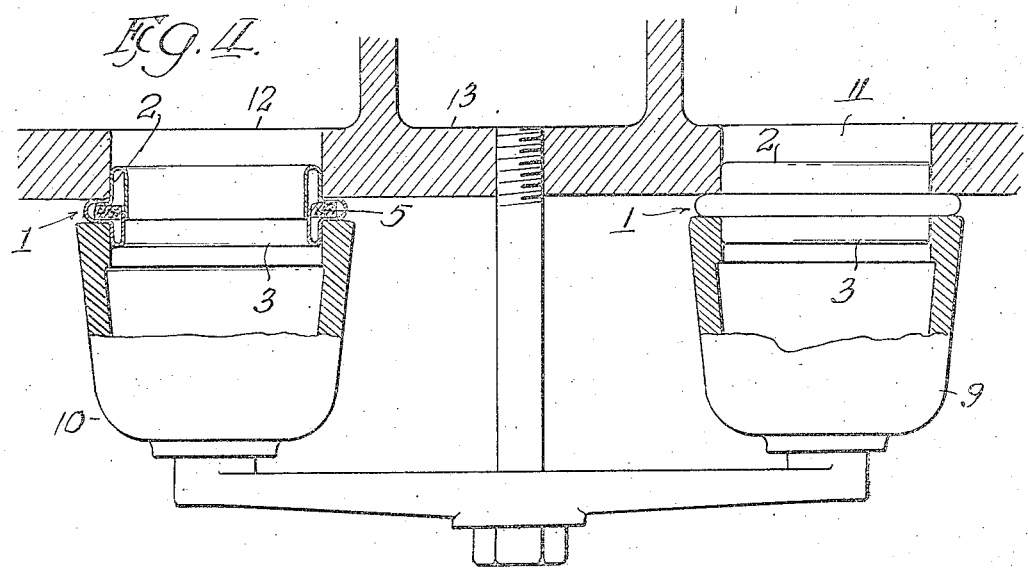
Inventor
Claude B. Bailey Patented Feb. 3, 1925.

1,524,682

UNITED STATES PATENT OFFICE.

CLAUDE B. BAILEY, OF WYANDOTTE, MICHIGAN, ASSIGNOR, BY MESNE ASSIGNMENTS, TO McCORD RADIATOR & MFG. CO., OF DETROIT, MICHIGAN, A CORPORATION OF MAINE.

GASKET.

Application filed September 1, 1921. Serial No. 497,702.

*To all whom it may concern:*

Be it known that I, CLAUDE B. BAILEY, a citizen of the United States, residing at Wyandotte, in the county of Wayne and State of Michigan, have invented new and useful Improvements in Gaskets, of which the following is a specification.

This invention relates to gaskets and more particularly to gaskets made of sheet metal and shaped to provide two annular guide flanges on opposite sides of an outwardly extending annular section forming a chamber to receive and retain a ring of fibrous material, such as asbestos.

One object of my invention is to reinforce or strengthen both of the tubular guide flanges so that the same will not be bent inward or be otherwise displaced when such flanges strike against the edges of the holes or ports of the parts into which the flanges are inserted in the application of the gasket in its position of use.

A further object of my invention is to make the reinforcing flanges or parts integral with the respective guide flanges so that the guide and reinforcing flanges are in one piece and thus strengthen the construction and facilitate its making and handling.

The invention consists further in the matters hereinafter described and more particularly pointed out in the appended claims.

In the accompanying drawings—

Fig. 1 is a side elevational view, partly in section, of a gasket constructed in accordance with my invention;

Fig. 2 is a diametrical sectional view taken on line 2—2 of Fig. 1;

Fig. 3 is an enlarged transverse sectional view through one side of the gasket to more fully illustrate the details and arrangement of the structure; and Fig. 4 is a horizontal sectional view taken through that portion of the wall of an engine casing provided with ports for the intake and exhaust manifolds, respectively, and showing gaskets of my invention between such parts at the joints thereof.

As shown in the drawings, the gasket 1 is annular, has a body portion made of sheet metal, such as copper, and formed to provide two tubular guide flanges 2, 3 on opposite sides of an outwardly extending section 4 forming an annular chamber to receive and retain a ring 5 of fibrous material, such as asbestos.

To reinforce or strengthen both of said tubular guide flanges 2 and 3 against being bent inward or being otherwise displaced out of their guiding positions in the insertion of the guide flanges into ports, holes, and the like, I provide said guide flanges with reinforcing parts or flanges 6 and 7. These are located inside of the guide flanges 2 and 3 in substantial alignment and having their inner meeting ends overlapping, as shown in Figs. 2 and 3, and forming a closure for the inside of the channel 4. The overlapping ends of the flanges 6 and 7 also bear against the inner edge of the ring 5, and in the particular gasket shown, the flanges 6 and 7 are integral with their respective guide flanges. This is brought about by making the guide flanges 2 and 3 in the first instance of a width to provide the reinforcing flanges 6 and 7 by bending the latter inward, as shown in the drawings. The folded edges thus provided constitute the outer annular edges of said guide flanges and being rounded, as shown, present no sharp corners for striking against the edges of the ports or holes into which the flanges may be inserted and thus facilitate inserting the gasket into position of use.

The metallic portion of the gasket structure described is made in two separate parts by making the channed section 4 integral with the guide flange 3 at the base thereof and substantially at right-angles thereto. The other part of the gasket comprises the guide flange 2, and this has an outwardly extending, integral, annular flange 8 at the base thereof and substantially at right-angles thereto. In assembling such parts, the flange 8 is inserted into the channel section 4 on the packing ring 5 and overlapped by the adjacent portion of the channel section 4.

The flange 8 bearing against the ring 5 serves to hold the guide flange 2 and its reinforcing flange 6 against bending outward. The flange 8 being held against the ring 5 by the overlapped part of the channel section 4 and the inner end of the flange 6 bearing against the ring 5 through the interposed portion of the flange 7, holds the guide flange 2 and its reinforcing flange 6 from bending inward. The channel section 4 engaging about the ring 5 holds the guide flange 3 and its flange 7 from inward bending, while the latter being overlapped by the flange 6 holds the guide flange 3 and its flange 7 from outward bending. In this manner the guide flanges 2, 3 are held in proper positions and both are reinforced or strengthened as described.

In Fig. 4 I have shown an intake manifold 9 and an exhaust manifold 10. These register with ports 11 and 12, respectively, in the wall 13 of the engine casing when the manifolds are in use and clamped against said wall, as shown. For each manifold there is a gasket 1, this being used at the joint between the manifold and the associated cylinder port. When applying the manifold against the cylinder wall, a gasket 1 is first applied to the manifold before the latter is applied to the engine. In applying the gasket, one of its tubular guide flanges, say the one 3 for example, is inserted into the open end of the manifold until stopped by the annular section 4 contacting with the end of the manifold. This connects the gasket with the manifold—in other words, the maifold carries the gasket, and, as the guide flange 3 has the reinforcing flange 7, it follows that the guide flange 3 is sufficiently reinforced or strengthened so that it will not be bent or displaced inward in inserting the guide flange into the opening in the manifold. The manifold carrying the gasket is then applied to the engine, with the guide flange 2 of the gasket projecting outward from the manifold. This is inserted into the cylinder port. In inserting the guide flange 2 into the cylinder port (11 or 12 as the case may be), the guide flange is likely to strike the edge of the cylinder port or against the wall 13 about the port, and being reinforced or strengthened by the flange 6, the guide flange 2 is prevented from being bent inward or otherwise displaced on striking such parts.

Manifestly, the use of the gasket is not limited to one application; that is, the guide flanges 2 and 3 being held against bending are thus maintained in proper guiding positions and enable the gasket to be used over and over again and thus does not have to be discarded or thrown away after one installation. The reinforcing flanges 6 and 7 overlapping at their inner ends in the manner shown, provides a closure for the inside of the channel member 4 and thus protects the ring 5 against fouling by the passage of gases through the gasket whether the gasket is at the intake or exhaust port of the engine. Moreover, the fact that the ring 5 is closed in the manner described prevents damaging or injuring of the ring by hot exhaust gases when the gasket is used at the exhaust side of the engine.

As illustrated in Fig. 3, the guide flanges 2 and 3 and their reinforcing flanges 6 and 7 are slightly tapered to take care of any inaccuracies in machining the openings in the engine cylinder in the manufacture, and, furthermore, the guide flange 2 is offset slightly inward from the plane of the guide flange 3 so as to absorb such inaccuracies.

While I have shown and described herein in detail a gasket constructed in accordance with my invention, it is of course to be understood that the details of construction and arrangement of parts may be variously changed and modified without departing from the spirit and scope of my invention.

I claim as my invention:

1. A gasket, comprising a metallic body portion formed to provide two tubular guide flanges on opposite sides of an outwardly extending annular section, and means carried by both of said guide flanges for strengthening and holding the same against bending.

2. A gasket, comprising a metallic body portion formed to provide two tubular guide flanges on opposite sides of an outwardly extending section forming an annular chamber, a ring of fibrous material in said chamber, and means carried by both of said guide flanges for strengthening and holding the same against lateral bending.

3. A gasket, comprising a metallic body portion formed to provide two tubular guide flanges on opposite sides of an outwardly extending section forming an annular chamber, a ring of fibrous material in said chamber, and each guide flange having a connected flange on the inside thereof for strengthening and holding the same against bending.

4. A gasket, comprising a metallic body portion formed to provide two tubular guide flnages on opposite sides of an outwardly extending section forming an annular chamber, a ring of fibrous material in said chamber, and each guide flange having a connected flange on the inside thereof for strengthening and holding the same against bending, said strengthening flanges extending toward each other and covering the inner edge of said ring.

5. A gasket, comprising a metallic body portion formed to provide two tubular guide flanges on opposite sides of an outwardly extending section forming an annular chamber, a ring of fibrous material in said chamber, each guide flange having an integral strengthening flange on the inside thereof, said flanges extending toward each other and having their inner ends overlapping and bearing against the inner edge of said ring.

6. A gasket, comprising two sections, one being formed to provide an outwardly extending annular chamber and having an integral tubular guide flange at one side thereof, the other section formed to have a base flange in said chamber and a tubular guide flange extending outward therefrom on the opposite side of and in substantial alignment with the first mentioned guide flange, a ring of fibrous material in said chamber for holding said base flange against said section, each guide flange having a strengthening flange integral therewith and on the inside thereof, said strengthening flanges extending toward each other and overlapping at their meeting ends and bearing against the inner edge of said ring.

7. A gasket, comprising a metallic body portion formed to provide two tubular guide flanges on opposite sides of an outwardly extending annular section, and annular means inside of said guide flanges and connected with both of the same for holding them against bending.

8. A gasket, comprising a metallic body portion formed to provide two tubular guide flanges on opposite sides of an outwardly extending annular section, and annular means inside of said guide flanges and connected with both of the same along their outer edges for holding said flanges against bending.

9. A gasket, comprising a metallic body portion formed to provide two tubular guide flanges on opposite sides of an outwardly extending annular section forming an annular chamber, a ring of fibrous material in said chamber, and annular means inside of said guide flanges and extending across the inner edge of said ring, said means extending to the outer edges of said flanges and connected therewith along said edges for holding said flanges against bending.

In testimony that I claim the foregoing as my invention, I affix my signature, this 29th day of August, A. D. 1921.

CLAUDE B. BAILEY.